(12) United States Patent
Small et al.

(10) Patent No.: US 8,078,359 B2
(45) Date of Patent: Dec. 13, 2011

(54) USER CONFIGURABLE VEHICLE USER INTERFACE

(75) Inventors: Evan Small, Palo Alto, CA (US); Brian Finn, Palo Alto, CA (US); Dan Adams, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 12/708,547

(22) Filed: Feb. 19, 2010

(65) Prior Publication Data

US 2011/0082615 A1 Apr. 7, 2011

Related U.S. Application Data

(60) Provisional application No. 61/278,337, filed on Oct. 5, 2009.

(51) Int. Cl.
*G06F 3/01* (2006.01)
*G06F 7/00* (2006.01)
(52) U.S. Cl. ............... 701/36; 701/1; 715/702
(58) Field of Classification Search .......... None
See application file for complete search history.

(56) References Cited

U.S. PATENT DOCUMENTS

| | | | |
|---|---|---|---|
| 5,555,502 A | | 9/1996 | Opel |
| 6,308,203 B1 * | | 10/2001 | Itabashi et al. ............... 709/217 |
| 7,683,771 B1 * | | 3/2010 | Loeb .............................. 340/461 |
| 7,730,401 B2 * | | 6/2010 | Gillespie et al. .............. 715/702 |
| 2002/0177944 A1 * | | 11/2002 | Ihara et al. ..................... 701/208 |
| 2006/0017552 A1 | | 1/2006 | Andreasen et al. |
| 2006/0155431 A1 | | 7/2006 | Berg |
| 2006/0161871 A1 * | | 7/2006 | Hotelling et al. ............. 715/863 |
| 2008/0082920 A1 * | | 4/2008 | Eom ............................. 715/702 |
| 2008/0122798 A1 * | | 5/2008 | Koshiyama et al. .......... 345/173 |
| 2008/0282173 A1 * | | 11/2008 | Kim et al. ...................... 715/747 |
| 2009/0144661 A1 * | | 6/2009 | Nakajima et al. ............. 715/835 |
| 2010/0070932 A1 * | | 3/2010 | Hur ................................ 715/863 |
| 2010/0095245 A1 * | | 4/2010 | Fino et al. ..................... 715/834 |
| 2010/0271385 A1 * | | 10/2010 | Lan et al. ...................... 345/589 |
| 2010/0318266 A1 * | | 12/2010 | Schaaf et al. ................... 701/49 |

OTHER PUBLICATIONS http://windows.microsoft.com/en-us/windows7/Arrange-windows-side-by-side-on-the-desktop-using-Snap archived Jun. 29, 2009 on http://www.archive.org/web/web.php.*

* cited by examiner

*Primary Examiner* — Khoi Tran
*Assistant Examiner* — Bao Long T Nguyen
(74) *Attorney, Agent, or Firm* — Patent Law Office of David G. Beck

(57) ABSTRACT

A method for configuring and personalizing a vehicle user interface is provided, the user interface utilizing a touch screen display mounted within the vehicle. User configurable aspects of the user interface include the number of zones within the touch screen display, the size of each zone, the subsystem interface assigned to each zone, the style and information contained within each subsystem interface, display brightness levels for the overall display or per zone, and the assignment and location of persistent soft buttons.

24 Claims, 6 Drawing Sheets

USER CONFIGURABLE VEHICLE USER INTERFACE

CROSS-REFERENCE TO RELATED APPLICATION

This application claims the benefit of the filing date of U.S. Provisional Patent Application Ser. No. 61/278,337, filed Oct. 5, 2009, the disclosure of which is incorporated herein by reference for any and all purposes.

FIELD OF THE INVENTION

The present invention relates generally to an interface and, more particularly, to a user interface for an infotainment system for use in a vehicle.

BACKGROUND OF THE INVENTION

A conventional vehicle includes various systems that allow the user, i.e., the driver or passenger, a means of interfacing with the vehicle, specifically providing a means for monitoring vehicle conditions and controlling various vehicle functions. Depending upon the complexity of the systems to be monitored and/or controlled, such a user interface may utilize visual, tactile and/or audible feedback. In a typical vehicle, the systems and conditions that may be monitored and/or controlled by such an interface include climate control (e.g., temperature settings, fan settings, defroster operation, etc.); entertainment system control (e.g., audio source, radio station, audio track, tonal balance, volume, etc.); and the navigation system (e.g., map, destination and route, estimated time of arrival (ETA), miles to destination, etc.).

While the cost of the various controls and subsystems that encompass a vehicle's user interface may make up only a small fraction of the total vehicle cost, the user interface, as the primary source of interaction between the user and the vehicle, is critical to the driver's operation and enjoyment of the vehicle. For instance, a poorly designed or poorly positioned headlight or windshield wiper switch may require the driver to divert attention from the road for an unsafe period of time in order for the driver to turn on the headlights or wipers. In other instances, an overly complex or poorly designed interface, for example an audio or navigation interface, may quickly lead to user frustration and dissatisfaction, and potentially lost car sales.

To insure driver and passenger safety, many primary control systems are designed to guarantee that the driver has at least a passing familiarity with the system's operation. Typically such driver familiarity is achieved by multiple manufacturers using the same type of control system located in approximately the same position. For example, most cars use either a rotating switch or a stalk-mounted switch, mounted to the left side of the steering wheel, to operate the headlights and parking lights. Similarly, most cars use a stalk-mounted switch to the right of the steering wheel to operate the windshield wipers. Although less critical, vehicle system monitors such as the speedometer or tachometer may also be mounted in similar locations by multiple manufacturers, thereby providing the driver with a familiar setting. Unlike the primary control systems, however, the user interfaces for the auxiliary vehicle systems are often the subject of substantial design innovation as different car manufacturers try to achieve an interface that is novel, intuitive and preferably relatively simple to operate. Often times a manufacturer will try to distinguish their vehicles from those of other manufacturers partially based on such an interface. Conversely, a poorly designed interface may be used by the competition to ridicule and devalue a particular vehicle.

In a conventional vehicle, the user interface is actually comprised of multiple interfaces, each interface grouping together those controls necessary to monitor and/or operate a specific vehicle subsystem or function. For example, the controls and display for the audio system are typically co-located as are the controls for the heating, ventilation and air conditioning (HVAC) system. In addition to simplifying subsystem control, co-location of controls allows the manufacturer to utilize a modular approach in which several options for a particular system, e.g., the audio system, may be provided. Not only does this approach simplify upgrades, it also allows the manufacturer to design and build a single subsystem that can be integrated into several different vehicle models.

In the past decade, the advent of dash-mounted monitors has caused a major change in the design of vehicle interfaces. In addition to being used in navigation systems, such monitors allow various information to be communicated to the user as well as providing a novel technique for controlling system functionality. For example, in addition to its use in the navigation system, some vehicles use a multi-page menu approach to provide the driver and/or passenger with control over the audio system, the HVAC system, on-board or Bluetooth® enabled/coupled communication devices, etc. In such an application, either a touch-sensitive display may be used or a non-touch-sensitive monitor may be used with corresponding hard buttons (e.g., mounted around the periphery of the display) or with a mouse-like pointer that allows selection of designated functions.

While conventional vehicles provide a variety of devices and techniques for the driver and/or passenger to control and monitor the vehicle's various subsystems and functions, typically the end user is given no ability to modify or customize the interface to meet their particular needs and usage patterns. Typically if the user wants a particular option, for example a sophisticated audio system, the user must accept the interface that is provided with that option. Additionally, due to the ever-increasing complexity of many vehicle subsystems, user interfaces have become overly complex and sometimes counter-intuitive, resulting in user frustration and disappointment. In some instances where the end-user is either unable or unwilling to learn the intricacies of a particular interface, the user may end up utilizing only a portion of the subsystem's capabilities. Accordingly, what is needed is an improved user interface that overcomes some of the problems and deficiencies of a conventional vehicle's user interface. The present invention provides such a user interface.

SUMMARY OF THE INVENTION

The present invention provides a method for configuring and personalizing a vehicle user interface, the user interface utilizing a touch screen display mounted within the vehicle, where the touch screen display is coupled to a system controller. The method includes the steps of inputting user configuration instructions; dividing the touch screen into a plurality of zones based on the user configuration instructions; selecting vehicle subsystem interfaces from a plurality of available vehicle subsystem interfaces; selecting zone positions for the selected vehicle subsystem interfaces; and displaying the selected vehicle subsystem interfaces within the selected zone positions of the touch screen display. The method may further comprise the step of switching zone positions for selected vehicle subsystem interfaces, for example using a touch-and-drag motion. The method may further comprise the step of re-sizing a zone, for example by using a touch-and-drag motion relative to a zone boundary, where the system may be configured to cause the zone boundary to snap to a predefined boundary location. The method may further comprise the use of persistent soft buttons. The method may further comprise the step of selecting and modifying a specific vehicle subsystem interface, for example by adding/deleting icons, monitored information, and/or control soft buttons. The method may further comprise the step of selecting and modifying a specific vehicle subsystem interface by modifying the data presentation style, for example by selecting one style from a plurality of available data presentation styles. The method may further comprise the step of selecting and modifying a specific vehicle subsystem interface by remotely modifying the data presentation style on a remotely located computer and then downloading the modified data presentation style to the system controller. The method may further comprise the step of determining ambient light conditions and adjusting the display's brightness level depending upon the ambient light conditions, where preferably the brightness levels for different ambient light conditions are set through the user configuration instructions. The method may further comprise the step of monitoring screen use and switching the touch screen from a normal use mode to a sleep mode after a preset time period with no monitored screen use, where the display's brightness level is set based on whether the screen is operating in the normal use mode or the sleep mode, and where preferably the preset time period and/or the brightness levels are set through the user configuration instructions. The method may further comprise the step of monitoring screen use per zone and switching that zone of the touch screen from a normal use mode to a sleep mode after a preset time period with no monitored screen use within the zone in question, where that zone's brightness level is set based on whether the zone is operating in the normal use mode or the sleep mode, and where preferably the preset time period per zone and/or the brightness levels for each zone are set through the user configuration instructions. The method may further comprise the steps of recording sets of configuration instructions as a user preference, and assigning a reference designator to each set of recorded configuration instructions.

A further understanding of the nature and advantages of the present invention may be realized by reference to the remaining portions of the specification and the drawings.

DESCRIPTION OF THE SPECIFIC EMBODIMENTS

The present invention utilizes a large format touch-screen as the primary user interface for multiple vehicle subsystems. In a preferred embodiment, illustrated in FIG. 1, touch-screen 100 is a 17-inch screen with a 16:10 aspect ratio. Due to its size as well as the limitations on available mounting space in a typical vehicle, preferably screen 100 is mounted in portrait mode within the vehicle's central console. Besides being aesthetically pleasing, such a mounting location provides access to the data on the screen as well as the displayed system controls to both the driver and the passenger seated in the passenger front seat.

Figure 2:
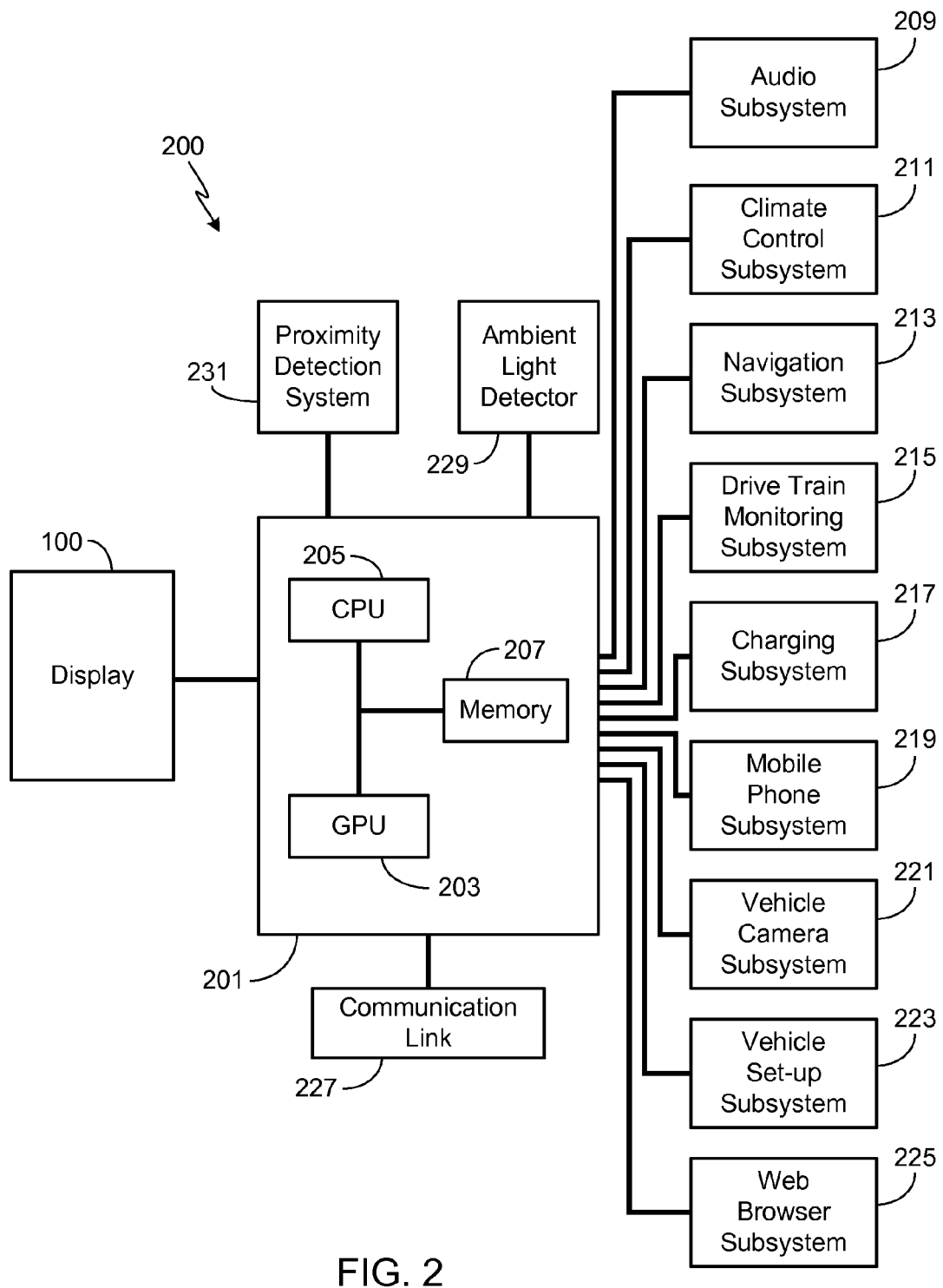
FIG. 2 provides a block diagram of the control system for the multi-zone, touch screen display shown in FIG. 1.

FIG. 2 provides a block diagram of an interface system 200 that includes touch-screen 100. In system 200, display 100 is coupled to a system controller 201. Controller 201 includes a graphical processing unit (GPU) 203, a central processing unit (CPU) 205, and memory 207. CPU 205 and GPU 207 may be separate or contained on a single chip set. Memory 207 may be comprised of flash memory, a solid state disk drive, a hard disk drive, or any other memory type or combination of memory types. Controller 201 is coupled to a variety of different vehicle subsystems, including all of the vehicle subsystem controls and vehicle subsystem monitors that are to be accessed and/or viewed on display 100. Exemplary vehicle subsystems include audio subsystem 209, climate control subsystem 211, navigation subsystem 213, drive train subsystem 215, charging subsystem 217, mobile phone subsystem 219, vehicle camera subsystem 221, vehicle set-up subsystem 223 and web browser subsystem 225. Vehicle set-up subsystem 223 allows general vehicle operating conditions to be set, conditions such as seat position, moon roof or sun roof position/operation, internal and external lighting, windshield wiper operation, etc.) Preferably a mobile telecommunications link 227 is also coupled to controller 201, thereby allowing the controller to obtain updates, interface configuration profiles, and other data from an external data source (e.g., manufacturer, dealer, service center, web-based application, remote home-based system, etc.). Mobile telecommunications link 227 may be based on any of a variety of different standards including, but not limited to, GSM EDGE, UMTS, CDMA2000, DECT, and WiMAX.

In a preferred embodiment, touch-screen 100 allows the user to configure the data and controls presented on the screen in a variety of ways, thus allowing the user interface to be personalized. Typically the user configures the display and controls using the display itself during the configuration process. Alternately, in at least one embodiment the user is able to configure the interface using a remote system, for example using a web-based interface application on a home computer, then download the configuration instructions to interface controller 201 via communication link 227.

One way in which touch-screen system 100 is configurable is in the number of zones used by the display. For example, in the embodiment illustrated in FIG. 1, display 100 is divided into four zones 101-104. Display 100 may, however, be divided into a fewer, or greater, number of zones. As shown, uppermost zone 101 is comprised of one or more soft buttons 105. Alternately, or in addition to soft buttons 105, zone 101 may be used to display system information, e.g., status of various subsystems, etc. As used herein, a soft button refers to a pre-defined, touch-sensitive region of display 100 that activates or otherwise controls a function in a manner similar to that of a hard button (i.e., a toggle switch, a push button, etc.). As soft buttons are well known in the art, further description will not be provided herein.

Preferably zone 101 is comprised of persistent soft buttons, i.e., soft buttons that persist regardless of how the user configures and uses the remaining portion of display 100. In at least one embodiment persistent soft buttons 105 provide the user with access to the general display control settings. Soft buttons 105 may also be configured to provide the user with rapid access to frequently used interface functions, for example, direct access to specific subsystems (e.g., general set-up, climate control subsystem, audio subsystem, mobile/cell phone interface (e.g., Bluetooth® enabled phone), navigation subsystem, drive train monitoring interface, battery charging subsystem interface, web browser, back-up and/or forward view camera, etc.). Soft buttons 105 may be pre-configured or user configurable.

Figure 1:
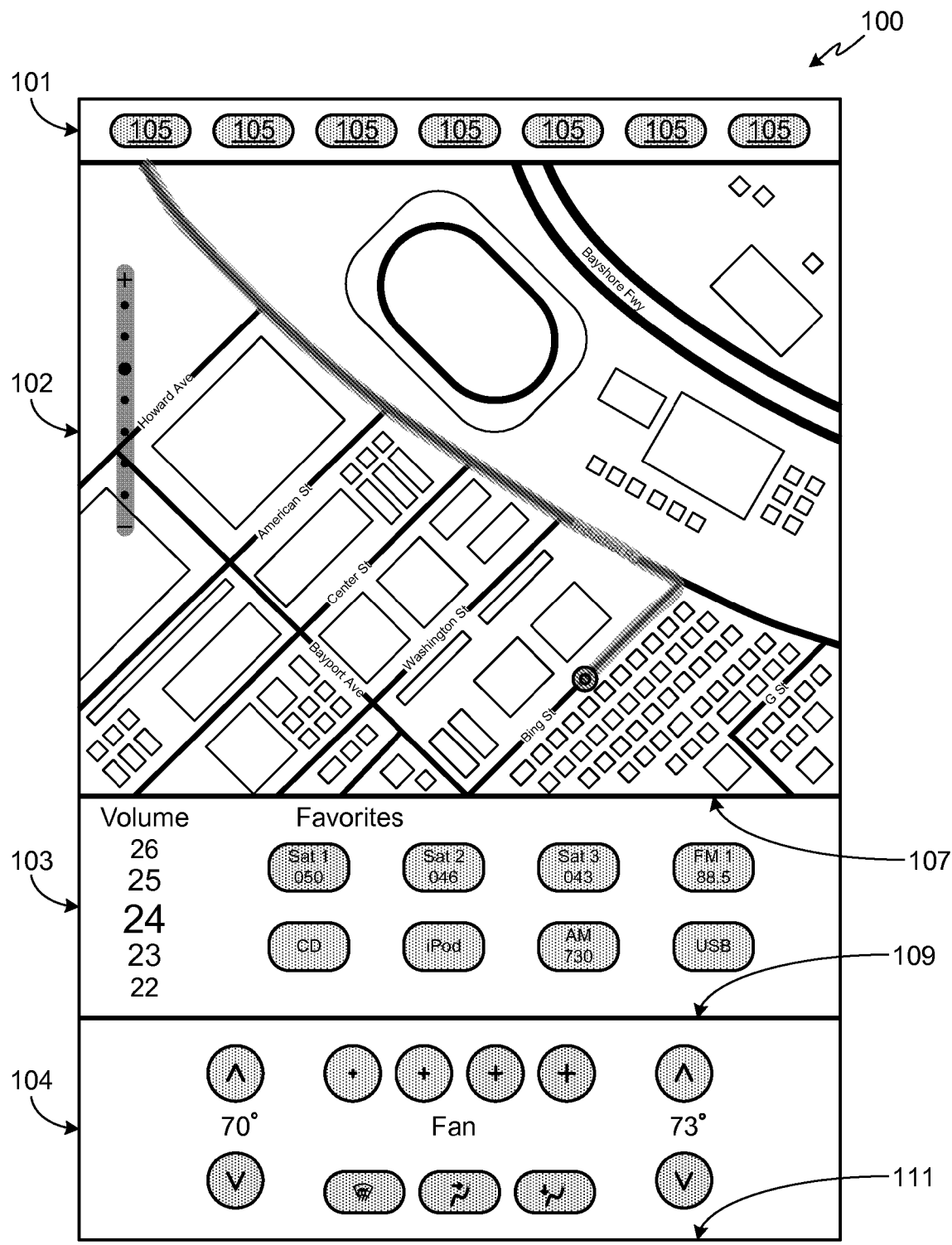
FIG. 1 illustrates a multi-zone, touch screen vehicle user interface in accordance with the invention.

The remaining portion of display 100, i.e., that portion of the screen other than zone 1, may be divided into any number of zones with each zone preferably representing a different vehicle subsystem interface. The number of zones as well as the size of each zone is typically driven by the overall size of the display and the amount of information to be displayed in a particular zone. For example, a zone providing climate control information typically requires much less display area than a zone used for the navigation system. In FIG. 1, zone 102 displays navigation subsystem controls/map, zone 103 displays audio subsystem controls, and zone 104 displays climate subsystem controls. Note that while display 100 may be configured with any number of zones of any size, preferably display 100 is pre-configured by the vehicle manufacturer or a representative of the vehicle manufacturer (i.e., a service center, etc.) to limit the number and size of the zones, thus providing a reasonable, but not unlimited, number of options from which the user may select.

In addition to setting the number and size of the zones, in one aspect of the invention, the user is able to further personalize the display by pre-setting which subsystem interface is located in a particular zone. For example, the vehicle's owner or a particular driver of the vehicle may enjoy frequently changing aspects of the audio system, e.g., the audio source, the channel or track being played, the tonal balance, etc. As such, this particular user may set the audio system to be in the most convenient and easily accessible zone of the display. An alternate driver who may not care that much about the particulars of the audio system, or may not even listen to any audio programming while driving, may prefer to display a different set of system controls within this same display zone.

When a particular user configures display 100, thereby personalizing the vehicle's user interface to their particular interface preferences, preferably this set of configuration instructions is retained in memory 207. As a result of recording their preferences, the user only has to go through the interface personalization process once, after which they may simply call up the previously recorded preferences. In a preferred implementation of the invention, system 200 is configured to accommodate multiple drivers/users, allowing each driver/user to record their preferences in memory 207. Typically system 200 is configured to allow between two and four such configurations to be recorded in memory 207 thus, for example, allowing each driver in a family of four to record their own interface preferences. Then when one of the drivers with a pre-recorded set of interface preferences enters the vehicle, they simply select their previously recorded preferences. Selection of a pre-recorded set of interface preferences may be automatic, for example by utilizing means that identifies a particular driver. Various means that allow the identity of a user to be determined are known, including key fobs with embedded user identification information and sophisticated image recognition systems. Alternately, system 200 may require that a particular user select their previously configured interface preferences, for example by pressing a hard button mounted within the vehicle, or pressing a soft button located on display 101. In one embodiment, soft buttons 105 include such selection means, specifically with buttons labeled "Driver 1", "Driver 2", "Driver 3", and "Driver 4". Due to the configurable nature of system 200, in at least one embodiment during interface set-up the user is able to name each selection button 105, i.e., "Evan", "Brian", "Kylie" and "Kira", thus adding further personalization to the interface.

As many users may find configuring the interface to their personal preferences to be a somewhat daunting task, in at least one embodiment the system includes a plurality of preset default settings. Users may simply select one of the default settings as their personal preference, or use the default setting as a starting point for further modification and personalization, or start from scratch to develop a completely personalized interface configuration. In embodiments utilizing preset default settings, preferably they are configured for different types of users. For example, one default may emphasize vehicle performance (e.g., "Car Enthusiast Interface); another may emphasize the audio system (e.g., "Music Lover Interface); while another may be designed for people that neither want nor enjoy too much technical information and therefore prefer a minimalist interface (e.g., "Technophobe Interface").

Although system 200 is designed to allow a user to pre-configure the interface to their personal preferences, once configured this is only the starting point. In a preferred embodiment, the user is able to alter the configuration of the display to their current preferences at any given time. Unless the user's new preferences are recorded, it will be appreciated that these modifications are only temporary, thus allowing the user to go back to their recorded preferences at any time. For example, while the default configuration for a particular user may emphasize the audio subsystem, during a particular drive the same user can re-configure the interface, for example switching positions, i.e., zones, between the audio interface and the climate control interface. Preferably switching is accomplished using a simple touch-and-drag motion, e.g., touching zone 103 at any location within zone 103 and dragging zone 3 into zone 102, thereby causing the information displayed in zones 102 and 103 to be reversed. Additionally, the user is also able to change the subsystem interface contained within a particular zone to an altogether different, previously un-shown, subsystem interface. For example, during a particular drive the same user may wish to monitor battery performance. In this situation, the user may use a drag-and-drop approach if the display includes an icon or similar representation of the desired interface. Preferably such an icon would be one of the persistent soft buttons 105. Alternately, one of the soft buttons 105 may be a drop-down menu that allows the user to select from a variety of available interfaces. Alternately, each zone may include a soft button with a drop-down menu (not shown) that allows interface selection. In the preferred embodiment, once the vehicle is stopped and powered down, the interface would return to the pre-altered configuration, for example the personalized interface for the last driver.

In addition to allowing users to alter which vehicle subsystem interfaces are displayed, and in which zones they are displayed, either via a preset configuration or on the fly, in the preferred embodiment the user is also able to vary the size of a particular zone. For example, while driving the user may determine that they would benefit from seeing more of the map presented on the navigation interface. In this instance, the user would then adjust the size of the selected interface, allowing the selected interface to cover more of the display screen 100. Preferably to vary the size of a particular zone, the user touches the screen at the boundary of the interface zone to be changed, and drags the interface to the desired location, thereby varying the size of that particular zone. For example, assuming that the navigation interface is initially in zone 102 as shown in FIG. 1, the user could touch display 100 at any location along zone boundary 107 and then drag this boundary downward in order to increase the size of the zone. In one embodiment, the user is able to place the zone boundary at any location within display 100. In an alternate embodiment, the zone boundaries move or 'snap' to pre-defined boundary locations, for example to the location of zone boundary 109 or to the location of zone boundary 111. Note that in this example, zone boundary 111 is also the bottom of display 100, thus allowing the navigation screen to expand to the full size of the display. It will be appreciated that the use of pre-defined boundary locations ensures optimal use of display 100 as it prevents zones from being inefficiently sized, for example leaving insufficient area after resizing one zone to allow a second zone to reside in the remaining area.

In at least one embodiment of the invention, the user is able to configure the interface displays and controls provided within a specific zone of the display for a particular subsystem interface. This aspect of the invention allows the user to personalize each system interface represented on the touch-screen display, moving controls to preferred locations and even removing or adding controls. For example, the user can configure the audio source aspect of the audio subsystem interface to show only available sources. This is particularly useful as some users may have many sources (e.g., AM, FM, CD, Satellite radio, MP3 player, etc.) while other users may have a very limited number of available audio sources (AM/FM radio only) and would therefore prefer to eliminate unused sources and reduce display clutter.

Figure 3:
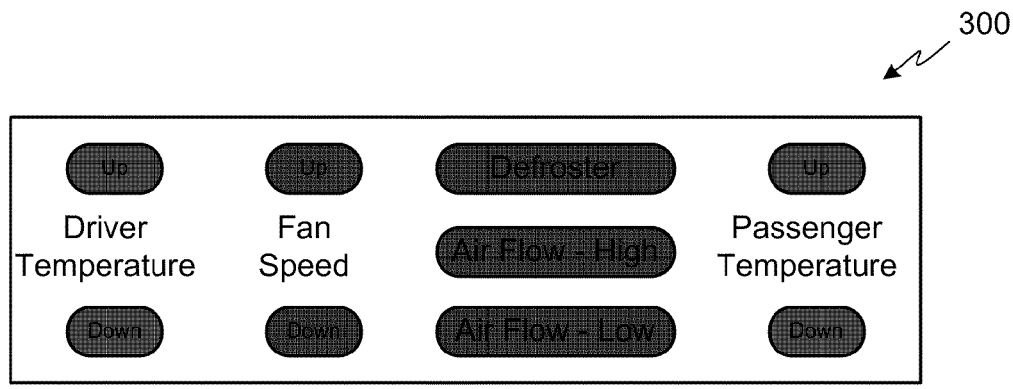
FIG. 3 illustrates an alternate style for a climate control subsystem interface.

In addition to configuring the controls provided for a specific subsystem interface, the present system also allows the user to configure the look and style of the user interface. Changing the user interface appearance may be for practical reasons, for example changing the size of the controls to aid a user with eyesight limitations; changing the language of displayed information; and/or changing between U.S. and metric units. Alternately, a user may wish to change the appearance of the interface for purely cosmetic reasons. For instance, one user may wish to utilize a graphical interface in which various functions and data are presented via icons, graphs, and illustrations (e.g., climate control subsystem interface 104 in FIG. 1). Another user, however, may wish to utilize a non-graphical interface, such as the climate control subsystem interface 301 shown in FIG. 3. In one preferred embodiment, the user is able to select the style for each displayed vehicle subsystem interface from several pre-configured styles. In an alternate approach and as previously noted, the user may modify the style of the interface on a remote system, for example using a web-based interface application on a home computer, then download the modified style to interface controller 201 via communication link 227.

Figure 4:
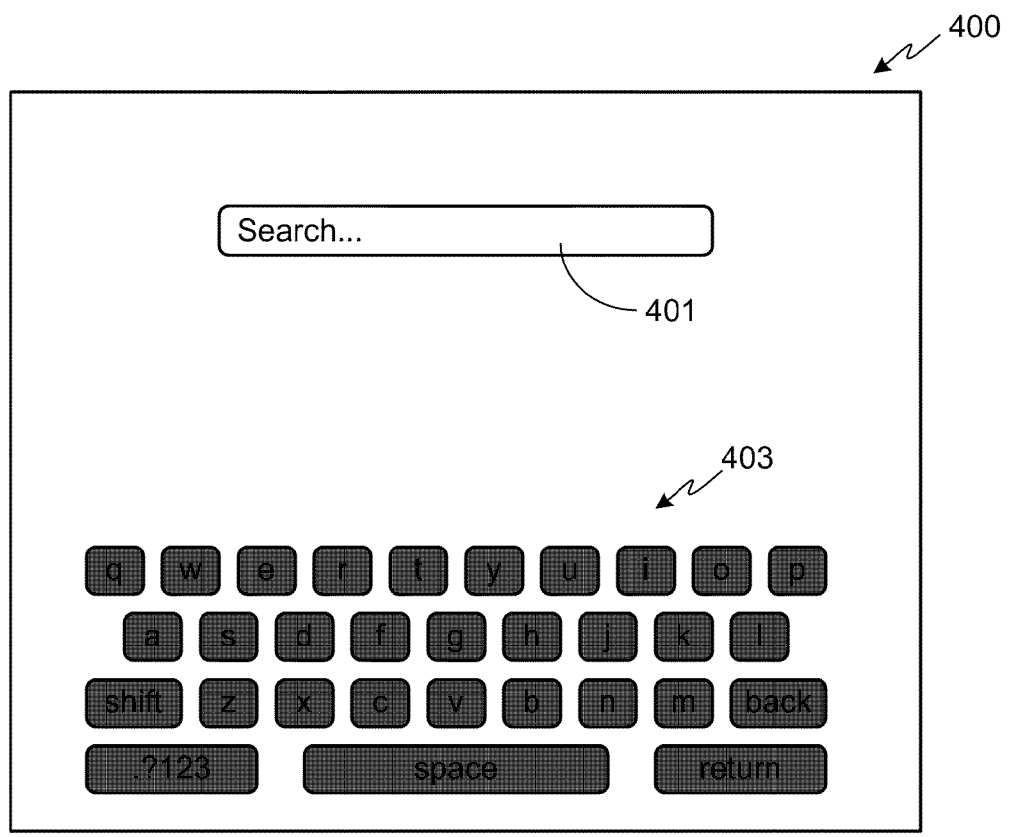
FIG. 4 illustrates a web browser subsystem interface.

In at least one embodiment of the invention, one of the zones of the user interface may be configured as a web browser. The web browser uses mobile telecommunication link 227. FIG. 4 illustrates an exemplary web browser interface 400 for use within one of the zones of display 100. As shown, interface 400 includes a search window 401 and a keyboard 403 for inputting requests. Additionally, in a preferred embodiment and as with some other mobile telecommunication devices, for example 3G and 4G mobile phones, the user is able to download applications into control system 201 which are then displayed on touch-screen 100.

Depending upon the vehicle options selected by the owner, the vehicle may include various systems that require temporary use of touch-screen 100. For example, the vehicle in question may be equipped with one or more cameras (e.g., back-up cameras, forward view cameras) to aid during parking. The phone interface, if one is included, may also require temporary use of touch-screen 100 during telephone number entry. In at least one embodiment of the invention, the user is able to configure which zone of screen 100 is utilized for such temporary applications.

In one embodiment of the invention, the user is able to independently configure the background color for each subsystem interface zone of touch-screen 100. For example, the user may configure the touch-screen such that the background color of the audio system interface is blue and the background of the climate control interface is black. In addition to color, in some embodiments the user is able to select a background pattern for each zone, for example using a pattern that simulates brushed aluminum, black anodized metal, textured leather, etc. Alternately, in some embodiments the user is able to select an overlay color for a particular zone, for example tinting a first zone red, a second zone blue, etc. Additionally, in some embodiments the user is able to select the size and/or color of the boundary separating zones (e.g., boundaries 107 and 109), ranging from no boundary to a large boundary. The use of various background colors, patterns, overlays, and zone boundaries provides the user with a rapid means of distinguishing between zones, a distinct benefit when the user must quickly find the desired control while driving.

Figure 5:
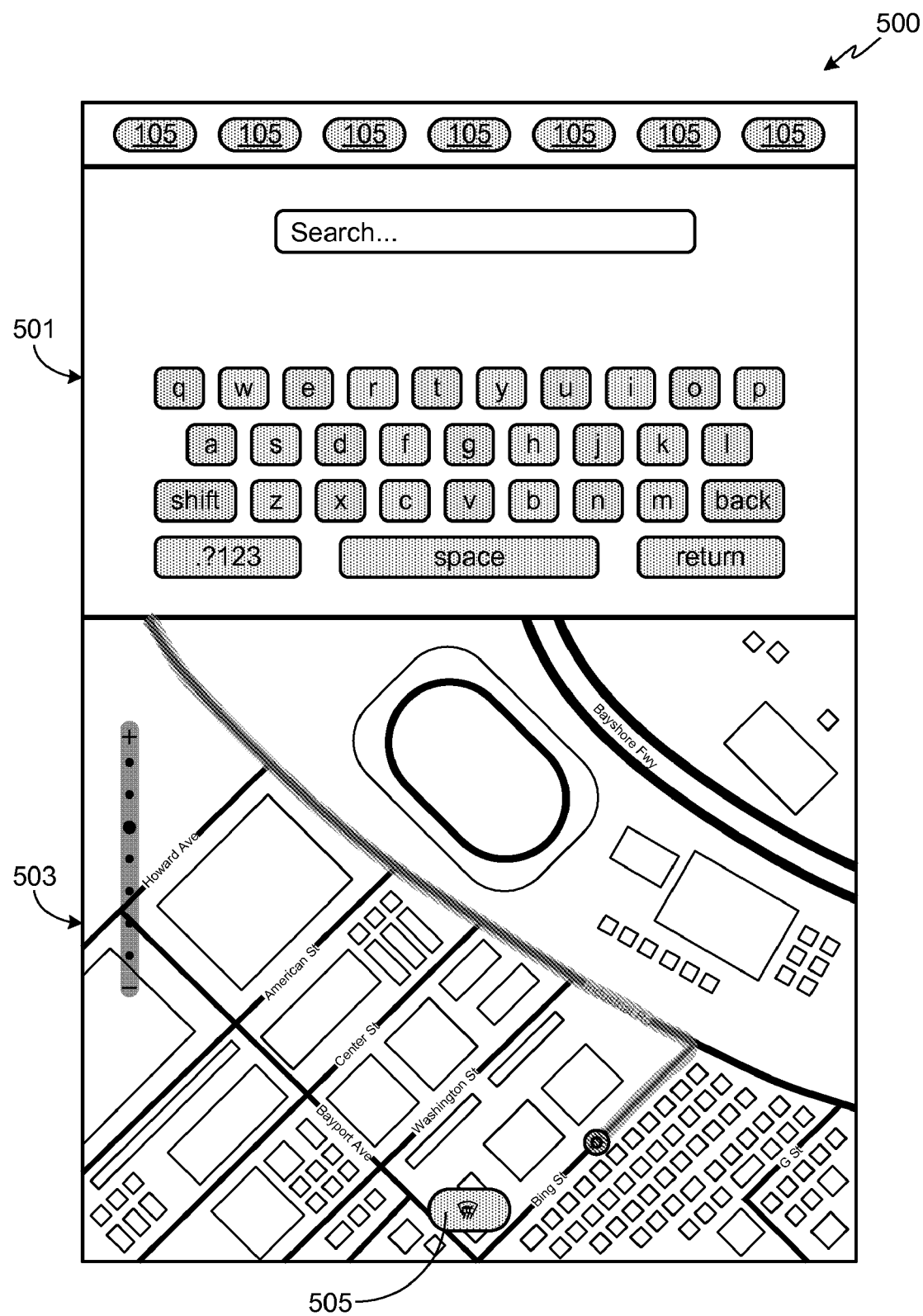
FIG. 5 illustrates a touch screen display with a web browser interface, a navigation subsystem interface, and a persistent defroster soft button.
Figure 6:
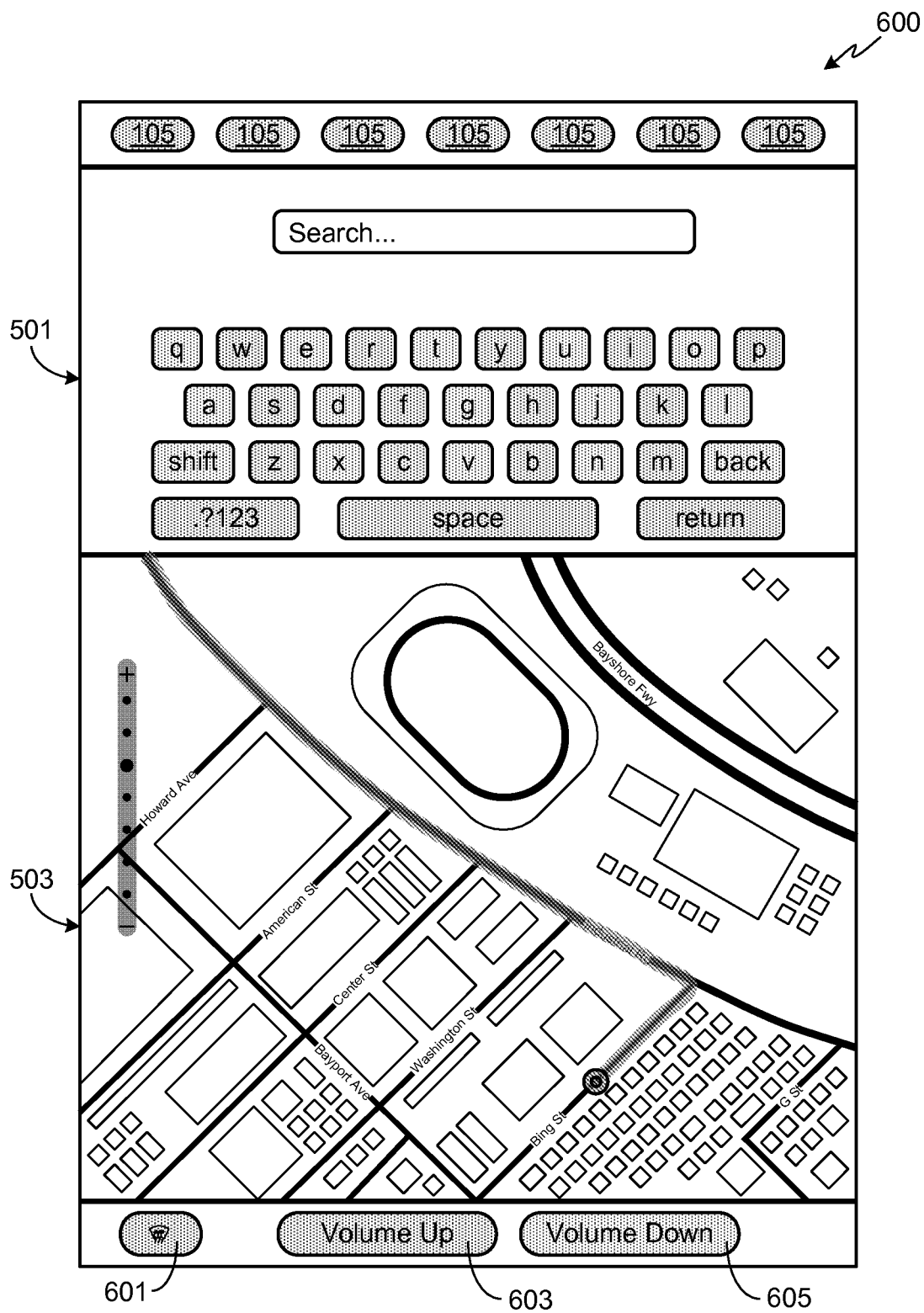
FIG. 6 illustrates the touch screen display of FIG. 5 with a region reserved for several persistent soft buttons.

As previously noted, preferably some of the interface soft buttons (e.g., buttons 105) are configured to persist and remain on the screen, regardless of how the user configures the display. Such persistent controls may be used for convenience, e.g., to access frequently used controls, or out of necessity, e.g., to allow the user to re-enter the interface configuration set-up menus. Additionally, it will be appreciated that other types of controls may be required to persist to ensure rapid access. For some controls, such persistence may be required by the Federal Motor Vehicle Safety Standards. In the present interface, persistent soft buttons are preferably included for some climate controls (e.g., defrost, temperature control) and for some audio subsystem soft buttons (e.g., volume control). As persistent soft buttons, if the user varies the size of a zone, for example expanding the navigation zone or the web browser zone, the persistent soft buttons remain visible. In at least one embodiment, when the system interface containing the persistent buttons is replaced, the persistent buttons remain in the same location and are clearly visible through the selected interface. For example, in FIG. 5 touch screen 500 is divided into two zones, an upper zone 501 comprised of a web browser subsystem interface, and a lower zone 503 comprised of a navigation subsystem interface. Persistent defroster button 505 is clearly visible through the navigation interface in zone 503. In at least one alternate embodiment, when the system interface containing a persistent button is replaced, the persistent button(s) moves to a different location on display 100, the new location selected to minimize interference with the non-persistent interface. For example, the user interface shown in FIG. 6 is identical to that shown in FIG. 5, except that a region near the bottom of display 600 has been reserved for persistent buttons, in this example defrost soft button 601, audio volume up soft button 603, and audio volume down soft button 605. As a result of the relocation of the persistent buttons, interference with the navigation subsystem is eliminated.

Preferably the light intensity or brightness of the touch-screen display (e.g., display 100, 500, 600) is configured to vary depending upon the ambient light intensity. It will be appreciated that the way in which the brightness varies depends upon the type of display technology employed (e.g., LED, OLED, AMOLED, LCD, etc.) and that the present invention is not limited to a specific type of display technology. The touch-screen light output may have only two levels, i.e., a daylight mode and a nighttime mode, or may vary over multiple steps, thus more accurately accounting for ambient light conditions (e.g., cloudy day versus sunny day). The screen brightness at each step may be pre-configured, for example by the manufacturer or service representative, or user configurable. To determine ambient light conditions, controller 201 is connected to an ambient light detector 229. Detector 229 may be mounted within the passenger compartment, for example on the dashboard, or mounted on an exterior location.

In addition to varying display brightness in response to ambient light conditions, preferably the screen is also configured to vary brightness depending upon usage. For example, while the touch-screen is in use, preferably the display brightness is at a first output level, e.g., at or near the maximum brightness level. In contrast, when the screen has not been used, i.e., touched, for a preset period of time, then the display brightness is significantly reduced, thereby saving energy and minimizing driver distraction. The latter mode of reduced brightness levels is referred to herein as the sleep mode. Note that controller 201 may be configured to monitor screen use, or screen use by zone as described below.

In addition to varying display brightness in response to ambient light conditions and/or display usage, preferably the screen is also configured to vary brightness levels depending upon vehicle power needs. This aspect is primarily of importance for electric vehicles (i.e., EVs) which typically have finite resources, e.g., where the amount of available power is limited to the current battery charge. Such a vehicle may have different operating modes that are either automatically engaged, or user selectable. For example, the vehicle may be operable in an extended range mode where the vehicle systems are optimized to deliver the maximum vehicle range for a given charge. Alternately, the vehicle may be designed to monitor charge levels and limit non-essential systems that draw power from the batteries once the monitored charge level drops to a predetermined level. In situations such as these, preferably the display may be configured to enter into either a display off or a reduced brightness level, thereby conserving battery resources.

In a preferred embodiment, the user is able to configure the various features relating to display brightness levels, sleep mode, etc. Configurable features include:

Brightness level during normal use. This aspect allows the user to set the brightness level to be employed during normal display use, i.e., when the user is interacting with the touch-screen. Preferably the user is able to set different brightness levels depending upon whether the screen is operating in daylight mode or nighttime mode.

Brightness level in sleep mode. This aspect allows the user to set the brightness level to be employed when the display is in sleep mode. For example, the user may set the screen to be completely off, except for persistent controls, while in sleep mode. Alternately, the user may configure the screen to operate at very low output (i.e., brightness) levels when in sleep mode, but of sufficient brightness to allow users to recognize displayed information while still achieving the benefits of lower power usage and minimal distraction. In some embodiments the user is able to set different brightness levels during sleep mode, depending upon whether the screen is operating in daylight mode or nighttime mode.

Brightness level by zone. This aspect allows the user to set the brightness level by zone, rather than overall screen. Preferably the user is able to set the brightness level by zone for both normal use (i.e., during display use) and while in sleep mode. This aspect of the invention has several benefits. First, it allows the user to highlight, by zone brightness, subsystem interfaces that are more important, such as the navigation interface. Second, it allows the user to keep the brightness level on certain zones, such as the navigation interface, relatively bright even when the user is not interacting via touch with the screen. As a result, power usage and driver distraction can be minimized on those zones that are of lesser import, i.e., those that are set and then left (e.g., audio interface, climate control), while ensuring that those zones that must be continually monitored are of sufficient brightness.

Brightness level by vehicle subsystem interface. This aspect allows the user to set the brightness level by the particular subsystem regardless of which zone it is displayed within. Therefore this aspect is similar to setting the brightness level by zone, except that it allows a particular interface to be moved to a different zone without affecting the brightness settings. As a result, even if the user moves a particular subsystem interface, e.g., the navigation subsystem interface, to a different zone, it will still operate the same, i.e., exhibit the same brightness levels during use and while in sleep mode. Similar to setting by zone, preferably the user is able to set the brightness level, per subsystem interface, for both normal use and sleep mode.

Time for sleep mode initiation. This aspect allows the user to set how long the screen must be untouched prior to entering into sleep mode.

Time for sleep mode initiation by zone. This aspect allows the user to set how long a particular zone must be untouched prior to that particular zone entering into sleep mode.

Time for sleep mode initiation by vehicle subsystem interface. This aspect allows the user to set how long a particular vehicle subsystem interface (e.g., navigation interface, audio system interface, climate control interface) must be untouched prior to that particular interface, regardless of zone, entering into sleep mode.

As previously noted, preferably the screen, in totality or by zone or by vehicle subsystem interface, is capable of entering into a sleep mode when the screen/zone/interface has not been touched for a preset period of time. Preferably once sleep mode is entered, a single touch on the screen causes the screen to exit sleep mode, thereby changing the brightness level from the preset sleep mode brightness level to the preset normal use brightness level. The system may be configured such that waking the system via touch causes the entire screen to change from sleep mode to normal mode, regardless of whether the system is set to enter sleep mode by display, by zone, or by subsystem interface as previously described. Alternately, the system may be configured to only wake the zone, or the subsystem interface, that is touched.

Figure 7:
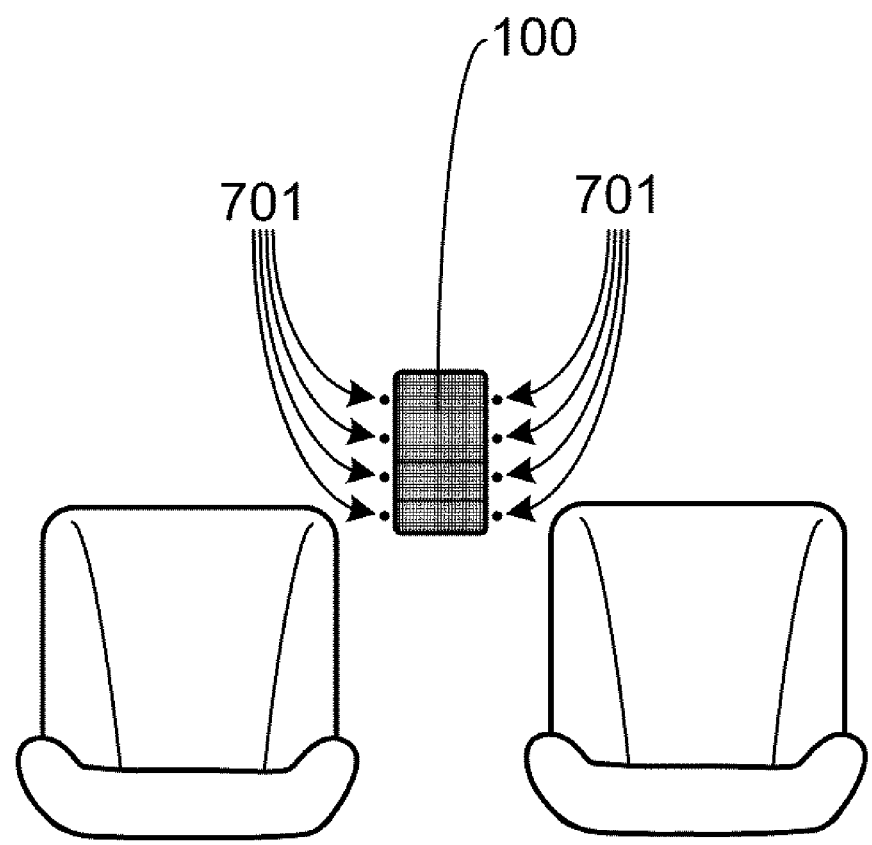
FIG. 7 illustrates a proximity detection system for use with the touch screen display of the invention.

In addition to waking the system by touch, preferably the system may also be configured to awaken by a user's proximity to the screen, where the detection sensitivity, and thus the proximity of the user to the screen that is required in order to activate the display, is either preset or user configurable. This configuration requires one or more proximity sensors 701 which comprise a proximity detection system 231, which is connected to controller 201. FIG. 7 illustrates this aspect of the invention. As shown, several proximity sensors 701 are mounted on either side of touch-screen display 100. Although sensors 701 may only be mounted on the driver's side of the display, preferably sensors 701 are mounted on both sides of display 100 and the proximity detection system is designed to allow the touch screen to be wakened from sleep mode by either the driver or the passenger in the front passenger seat.

It will be appreciated that various types of proximity sensors and proximity detection systems may be used with the invention, and that the invention is not limited to a specific type of proximity sensor or sensor system. In general, proximity sensors either monitor the ambient environment, looking for changes within this environment, or they emit a field or a beam and look for changes in the return signal. Exemplary proximity sensors and sensor systems include:

Electromagnetic beam: A common electromagnetic sensing system utilizes an electromagnetic beam (e.g., an infrared beam emitted by an infrared LED). Typically the source of the electromagnetic beam is located on one side of the area to be monitored, and a detector is mounted on the other side of the area to be monitored. Alternately, the system may simply monitor the return signal of such an electromagnetic beam, thus utilizing a reflective sensor approach.

Electromagnetic field: This type of sensor typically monitors a particular region of the electromagnetic spectrum, looking for changes within this region of the spectrum. For example, by monitoring the infrared portion of the spectrum, such a sensor can detect when a source of infrared radiation is in proximity to the detector.

Ultrasonic: An ultrasonic system typically emits sound pulses and monitors the time it takes for each sound pulse to be reflected back to the sensor. The sensitivity of the system is set by setting the return time threshold; if the return time is greater than the threshold the system determines that no object is proximate to the detection area while if the return time is less than the threshold the system determines that an object is proximate to the detection area.

Capacitive displacement sensor: Generally this type of system monitors the dielectric constant between two plates, this constant varying with the position of any conductive objects within its sensing range.

In one embodiment, the proximity detectors, e.g., sensors 701, are used to wake the entire display screen 100. In this approach, as the user (e.g., the driver or either the driver or the front seat passenger, depending upon the configuration of proximity detection system 231) reaches towards the display (e.g., display 100, 500, 600, etc.), the screen wakens from the sleep mode. An advantage of this approach over the previously described screen touch waking system is that the touch screen is ready to immediately receive a command from the user, as opposed to needing to be touched twice (i.e., the wake-up touch and the input touch). As in the configuration without the proximity sensors, preferably the user is able to configure the display brightness levels, both while in normal use mode and sleep mode, as well as the length of time that the screen must be untouched prior to entering into sleep mode. If desired, the system may be configured to enter into sleep mode per zone. Lastly, in at least one embodiment the user is able to set the sensitivity of the proximity detection system 231, thus minimizing false screen wake-ups.

In at least one preferred embodiment, proximity detection system 231 is configured to allow controller 201 to determine which zone of the touch screen display the user's hand is approaching. Typically this determination is accomplished through the use of multiple sensors 701 relative to one, or both, display sides as shown in FIG. 7. The use of multiple sensors 701 allows controller 201 to determine which zone of display 100 the user's hand is approaching, for example by determining which sensor 701 the user's hand is closest to when reaching towards the display, and then matching that sensor with a particular zone. In at least one embodiment, the user may configure the system to wake up only the zone proximate to the proximity sensor(s) that has detected the user's hand, rather than the entire display screen. This aspect of the invention allows the user to only activate, i.e., wake up, the vehicle subsystem interface of interest, for example the audio system interface, thus conserving power and minimizing distractions.

In the accompanying figures, it should be understood that identical reference symbols used on multiple figures refer to the same component, or components of equal functionality. Additionally, the accompanying figures are only meant to illustrate, not limit, the scope of the invention.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of configuring a vehicle interface, the method comprising the steps of:
providing a touch screen mounted within a vehicle, said touch screen divided into a plurality of zones;
providing vehicle interface configuration control to a user via a set of user configuration instructions, said step of providing vehicle interface configuration control further comprising the step of accepting a set of user configuration instructions into a system controller via said touch screen, said step of accepting said set of user configuration instructions further comprising the steps of:
accepting touch screen division instructions that determine the number of zones comprising said plurality of zones;
accepting assignment instructions that assign which of a plurality of vehicle subsystem interfaces are assigned to each of said plurality of zones, wherein each of said plurality of vehicle subsystem interfaces is comprised of a plurality of controls and display features specific to that vehicle subsystem interface;
accepting size instructions that determine a set of boundaries for each of said plurality of zones;
accepting interface presentation style instructions corresponding to at least one of said plurality of vehicle subsystem interfaces, wherein said interface presentation style instructions apply to said plurality of controls and display features that correspond to said at least one of said plurality of vehicle subsystem interfaces;
applying said set of user configuration instructions to said touch screen, said step of applying said set of user configuration instructions further comprising the steps of applying said touch screen division instructions, applying said assignment instructions, applying said zone size instructions, and applying said interface presentation style modification instructions;
positioning a plurality of persistent soft buttons on said touch screen, wherein each of said plurality of persistent soft buttons provide persistent function control and remain functional and visible on said touch screen regardless of said set of user configuration instructions; and
displaying said plurality of zones and said corresponding vehicle subsystem interfaces on said touch screen.

2. The method of claim 1, wherein said step of accepting assignment instructions that assign which of said plurality of vehicle subsystem interfaces are assigned to each of said plurality of zones further comprises the step of selecting which of said vehicle subsystem interfaces are to be assigned to each of said plurality of zones from a plurality of vehicle subsystem interfaces consisting of a climate control interface, an audio control interface, a mobile/cell phone interface, a navigation control interface, a drive train monitoring interface, a battery charging control interface, a vehicle set-up interface, and a web browser.

3. The method of claim 1, further comprising the step of switching zone positions for said plurality of vehicle subsystem interfaces, wherein said zone position switching step is performed via said touch screen.

4. The method of claim 3, wherein said zone position switching step further comprises the step of using a touch-and-drag motion on said touch screen.

5. The method of claim 1, further comprising the step of re-sizing said plurality of zones, wherein said re-sizing step further comprises the step of dragging at least one boundary of said sets of boundaries to a new boundary location via said touch screen.

6. The method of claim 5, wherein said new boundary location snaps to one of a plurality of preset boundary locations.

7. The method of claim 1, further comprising the steps of:
selecting a specific vehicle subsystem interface from said plurality of vehicle subsystem interfaces assigned to each of said plurality of zones; and
modifying said specific vehicle subsystem interface in accordance with a new set of interface presentation style instructions, wherein said new set of interface presentation style instructions apply to said plurality of controls and display features that correspond to said specific vehicle subsystem interface.

8. The method of claim 1, further comprising the steps of:
selecting a specific vehicle subsystem interface from said plurality of vehicle subsystem interfaces assigned to each of said plurality of zones; and
modifying said specific vehicle subsystem interface by adding and/or deleting icons, monitored information, and/or control soft buttons from said specific vehicle subsystem interface.

9. The method of claim 1, wherein said step of accepting interface presentation style instructions further comprises the step of selecting a data presentation style from a plurality of preset data presentation styles, and wherein said step of selecting said data presentation style is performed via said touch screen.

10. The method of claim 1, further comprising the steps of:
modifying a data presentation style associated with a specific vehicle subsystem interface of said plurality of vehicle subsystem interfaces corresponding to one of said plurality of zones, wherein said modifying step is performed remotely on a remotely located computer;
downloading said modified data presentation style to said system controller via a communication link coupled to said controller; and
selecting said modified data presentation style for said specific vehicle subsystem interface.

11. The method of claim 1, further comprising the steps of:
modifying said user configuration instructions remotely on a remotely located computer; and
downloading said user configuration instructions to said system controller via a communication link coupled to said controller.

12. The method of claim 1, further comprising the step of determining ambient light conditions, wherein ambient light conditions are detected by a light sensor coupled to said system controller, and wherein said displaying step further comprises displaying said plurality of vehicle subsystem interfaces assigned to each of said plurality of zones at a first display brightness level during daytime use, and displaying said at least two vehicle subsystem interfaces in said selected zone positions at a second display brightness level during nighttime use.

13. The method of claim 12, further comprising the step of setting said first and second display brightness levels in said user configuration instructions.

14. The method of claim 1, further comprising the step of determining ambient light conditions, wherein ambient light conditions are detected by a light sensor coupled to said system controller, and wherein said displaying step further comprises the step of selecting a display brightness level from a plurality of display brightness levels based on said ambient light conditions.

15. The method of claim 14, further comprising the step of setting said display plurality of brightness levels in said user configuration instructions.

16. The method of claim 1, further comprising the steps of:
monitoring screen use, wherein said monitoring step is performed by said system controller;
setting an operational mode for said touch screen based on said monitored screen use, wherein said operational mode is selected from a normal use mode and a sleep mode, and wherein said operational mode setting step further comprises the step of automatically switching from said normal use mode to said sleep mode after a preset period of time with no monitored screen use; and
setting a display brightness level based on whether said touch screen is in said normal use mode or in said sleep mode.

17. The method of claim 16, wherein said step of setting said display brightness level further comprises the step of setting said display brightness level to a first level when said touch screen is in said normal use mode and to a second level when said touch screen is in said sleep mode, and further comprising the step of setting said first and second levels in said user configuration instructions.

18. The method of claim 16, further comprising the step of setting said preset period of time in said user configuration instructions.

19. The method of claim 1, further comprising the steps of:
monitoring screen use independently within each zone of said plurality of zones, wherein said monitoring step is performed by said system controller;
setting an operational mode for each zone of said plurality of zones based on said monitored screen use for the corresponding zone of said plurality of zones, wherein said operational mode is selected from a normal use mode and a sleep mode; and
setting a display zone brightness level for each zone of said plurality of zones based on whether said zone is in said normal use mode or in said sleep mode.

20. The method of claim 19, wherein said step of setting said display zone brightness level for each zone of said plurality of zones further comprises the step of setting said display zone brightness level for each zone of said plurality of zones to a first level when said corresponding zone is in said normal use mode and to a second level when said corresponding zone is in said sleep mode, and further comprising the step of setting said first and second levels in said user configuration instructions.

21. The method of claim 19, wherein said step of setting said display zone brightness level for each zone of said plurality of zones further comprises the step of setting said display zone brightness level for each zone of said plurality of zones to a corresponding zone brightness level based on whether said zone is in said normal use mode or in said sleep mode and based on a set of zone brightness level instructions set within said user configuration instructions.

22. The method of claim 19, further comprising the step of automatically switching said operational mode for each zone of said plurality of zones from said normal use mode to said sleep mode after a preset period of time with no monitored screen use within the corresponding zone of said plurality of zones, and further comprising the step of setting said preset period of time in said user configuration instructions.

23. The method of claim 1, further comprising the steps of:
recording said user configuration instructions in a memory coupled to said system controller; and
assigning a reference designator to each set of user configuration instructions recorded in said memory.

24. The method of claim 23, wherein said reference designator is provided in said user configuration instructions.

\* \* \* \* \*